Jan. 12, 1971 — G. T. HAGESETH — 3,553,856
MACROSCOPIC SCATTERING ANALYZER
Filed Dec. 16, 1968 — 3 Sheets-Sheet 3
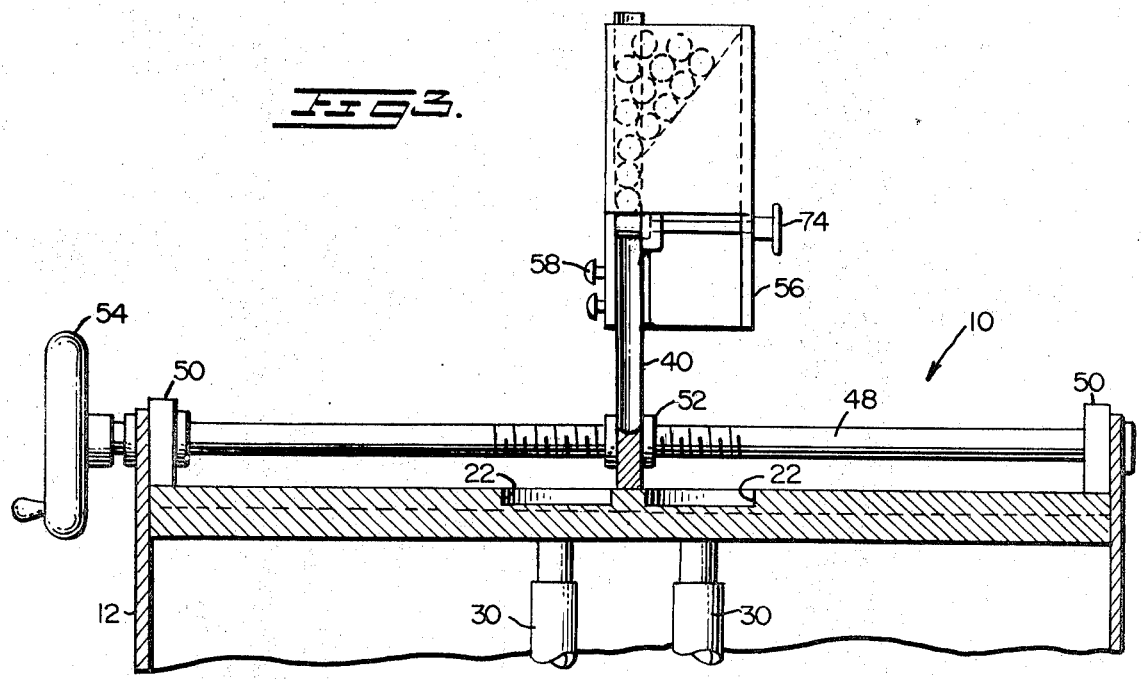
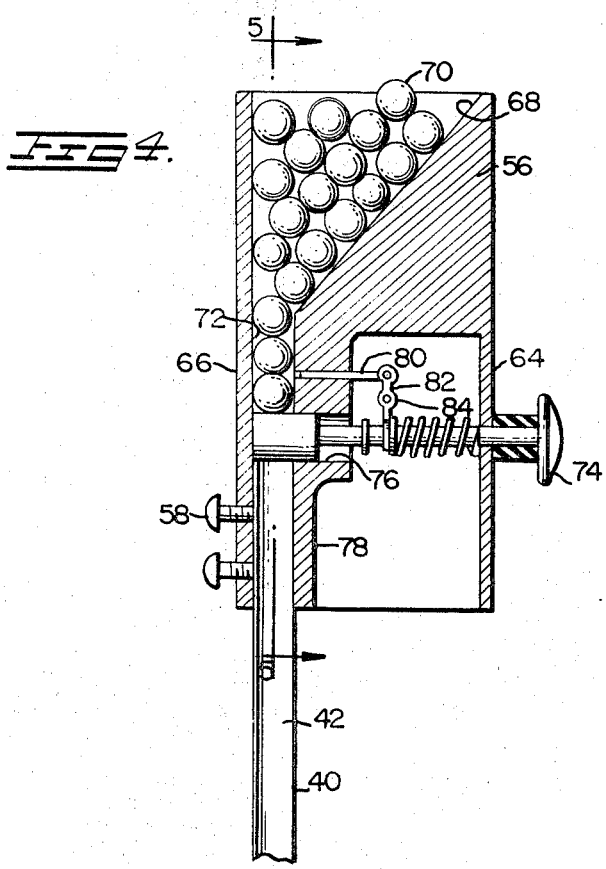
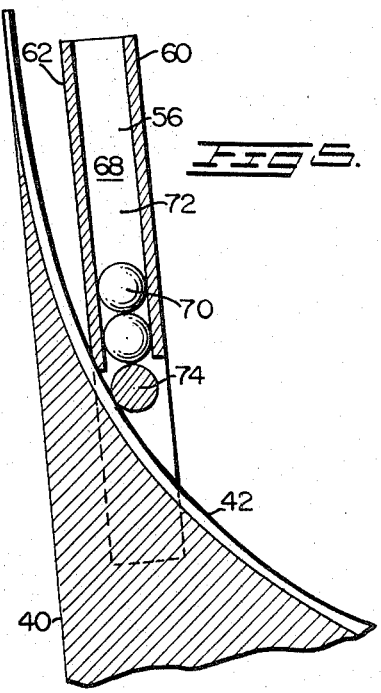
INVENTOR
GAYLORD T. HAGESETH
Stowell & Stowell
ATTORNEYS 3,553,856
Patented Jan. 12, 1971

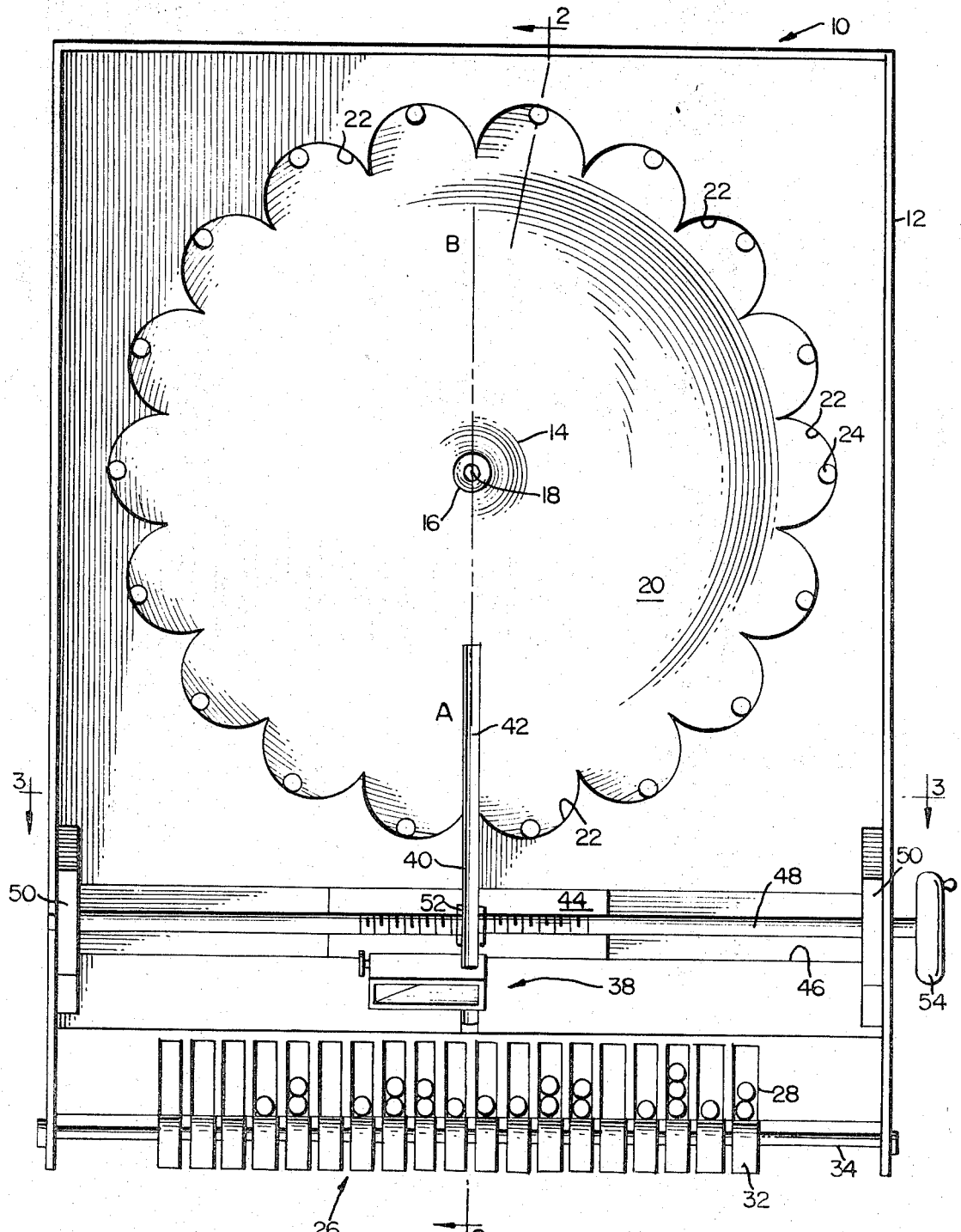

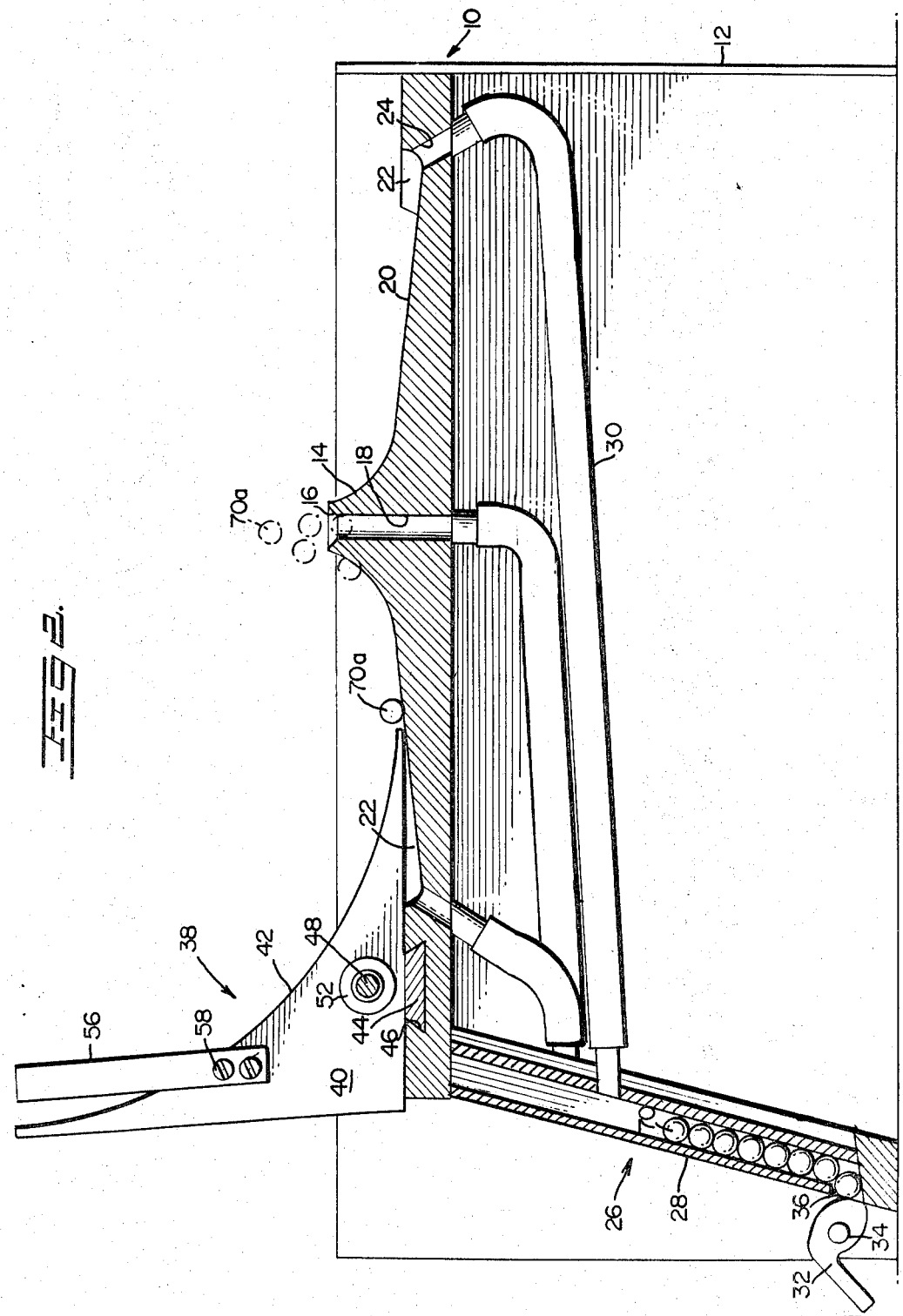

3,553,856
MACROSCOPIC SCATTERING ANALYZER
Gaylord T. Hageseth, Greensboro, N.C., assignor to Research Corporation, New York, N.Y., a nonprofit corporation of New York
Filed Dec. 16, 1968, Ser. No. 783,825
Int. Cl. G09b 23/20
U.S. Cl. 35—19               8 Claims

ABSTRACT OF THE DISCLOSURE

A macroscopic scattering analyzer having target represented by a surface of revolution defining an upstanding mound with a centrally disposed vertical recess therein. Radiation particles are represented by a launcher disposed adjacent the mound to deliver spheres in the direction of the recess, tangent to the base of the surface of the mound. Means are provided to vary impact parameters by laterally moving the launcher and to vary the impact energy by varying the velocity of delivery of the spheres to the mound. A series of receivers surround the mound to receive scattered spheres and record backscatter data.

BACKGROUND OF THE INVENTION

This invention relates generally to teaching devices and more particularly to macroscopic analyzers for teaching concepts of radiation scatter and capture in nuclear physics.

In teaching radiation concepts, it is important that students have an opportunity to measure various parameters of atomic collision processes. Such parameters include, for a given nucleus or atom, differential cross sections, angular distributions, threshold energies, resonant energies, scattering cross sections, capture cross sections and the like. Cross section of a given nucleus or atom is that area perpendicular to the direction of the radiation which is attributable to the nucleus or atom to account, geometrically, for its interaction with radiation. Angular distribution is the variation of differential cross section, for emissions of a given radiation in a nuclear reaction, with the angle of emission. Scattering cross section refers to the radiation scattered through a particular angle. Threshold energy is the smallest energy that a particle must have in order to cause reaction. Terms such as these are in common use in the art and are more fully defined in publications such as the "Glossary of Terms Used in Nuclear Science," British Standard 3455; 1962, British Standards Institution. Measurement of these parameters is generally accomplished by the use of a Van de Graff accelerator or similar device. Such devices are costly and are not readily available to most undergraduate physics majors.

SUMMARY OF THE INVENTION

The present invention provides a macroscopic scattering analyzer which enables students to measure the collision parameters of atoms and nuclei in a simple and inexpensive manner.

The invention also provides a device which illustrates atomic parameters by mechanically and macroscopically producing characteristic particle scatter in such a manner that students can measure characteristics reflecting these parameters.

In a preferred embodiment, the invention provides a macroscopic scattering analyzer having a surface of revolution defining a mound; a vertically oriented recess in the center of the mound; a series of receivers surrounding the base of the mound and a launcher disposed adjacent the base of the mound to deliver spheres parallel to a launch line bisecting the recess and tangent to the base of surface of revolution forming the mount; means to alter the impact parameters of the spheres by varying the position of the launcher along a line normal to the launch line; and means to vary the energy of delivery of the spheres.

These and other objects of the invention will become more apparent to those skilled in the art by reference to the following detailed description when viewed in light of the accompanying drawing, wherein like numerals indicate like components throughout the figures thereof and wherein:

FIG. 1 is a plan view of an analyzer in accordance with the invention;

FIG. 2 is a sectional view in elevation of the analyzer of FIG. 1 taken along the line 2—2 thereof;

FIG. 3 is a sectional view of the analyzer of FIG. 1 taken along the line 3—3 thereof;

FIG. 4 is an enlarged sectional view of a portion of the launching apparatus; and FIG. 5 is a further enlarged sectional view of the apparatus illustrated in FIG. 4 taken along the line 5—5 thereof.

DESCRIPTION OF THE PREFERRED EMBODIMENT

Referring now particularly to FIGS. 1 and 2 of the drawings, the analyzer comprises a horizontal platform, indicated generally at 10, supported by a housing 12 and having, on the upper surface thereof, a centrally disposed mound 14 formed as a $1/\rho$ potential surface of revolution. The mound could have the configuration of other potential surfaces instead of the $1/\rho$ surface such, for example, as an inverted $1/\rho$ surface, if so desired. A recess, comprising an annular tapered surface 16 and a vertical bore 18 is formed through the platform 10 at the center of the mound 14 to simulate particle capture as will be described hereinafter.

The mound 14 is surrounded with an annular, outwardly and downwardly tapering surface 20 which intersects the surface of the mound along a line where a tangent to the surface of the mound is substantially horizontal. A plurality of receivers 22 are disposed at equal angular intervals around the tapering surface 20 and have, formed therein, sphere transmitting bores 24.

A rack, shown generally at 26, is disposed at one end of the housing 12 beneath the platform 10 and is provided with a plurality of pairs of vertical sphere retaining rails 28. The pairs of rails 28 correspond to individual bores 24 and to the vertical bore 18. Sphere transmitting tubes 30 communicate each of the aforedescribed bores with a corresponding pair of rails 28. Release levers 32, pivotally mounted on a common axle 34 connected to the housing 12 and biased in the closed position illustrated, are disposed to normally block a sphere exit 36 formed in the bottom of each of the pairs of rails 28.

By lifting upwardly on the lever 32, the openings 36 are unblocked to provide discharge of the contents of individual pairs of rails.

A launcher, indicated generally at 38, is mounted on the platform 10 and comprises a vertical plate 40 having a concave arcuate track 42 formed along a diagonal edge thereof and extending from a substantially vertical orientation proximate the rear of the plate to a substantially horizontal orientation at the forward portion thereof.

By reference to FIG. 1, it will be seen that the plate 40 is disposed in parallel relationship to a launch line A–B drawn parallel to the sides of the housing 12 and bisecting the mound 16 and bore 18. The plate 40 has mounted thereto key 44 which is slidably disposed in a transverse slot 46 so transverse displacement of the key and plate with respect to the launch line A–B may be accomplished.

A threaded shaft 48, rotatably mounted at each end to the platform 10 by bearing members 50, is threaded through a bushing 52 transversely mounted in the plate 42. A hand crank 54, connected to one end of the shaft 48, provides means to rotate the shaft 48 and thereby drive the plate 40 in a transverse direction relative to the launch line A–B.

With particular reference to FIGS. 3 through 5, the plate 40 has mounted thereon a magazine 56 which bridges the track 42. The magazine is movably mounted on the plate by means of set screws 58 which clamp against the sides of the plate 40. By these means the magazine may be positioned and locked at desired points along the track 42 by manipulating the screws.

The magazine 56 is formed with forward and rear walls 60 and 62 and side walls 64 and 66 which, in conjunction with a downwardly sloping floor 68, form a storage chamber for spheres 70. The chamber feeds to a discharge slot 72, aligned with the track 42, which is normally blocked by a spring loaded plunger 74 slidably disposed through the wall 64 and a bore 76 in an intermediate wall 78. A secondary plunger 80, disposed through the intermediate wall 78 above the plunger 74 at a distance substantially equal to the diameter of one of the spheres 70, is provided with a forked connection to the plunger 74 through a lever 82, pivoted at 84, which acts, upon withdrawal of the plunger 74, to interpose and block downward movement of spheres above the sphere 70 immediately adjacent the plunger. The aforedescribed mechanism permits single shot gravity discharge of the spheres 70 from the magazine upon withdrawal of the plunger 74 from its blocking position. Obviously, other suitable gate mechanisms could be substituted for that specifically illustrated to accomplish the desired single shot discharge of the spheres as desired.

In operation, the launcher 38 is positioned laterally by means of the hand crank 54 to adjust impact parameter and the magazine 56 is vertically positioned along the track 42 to adjust the energy of impact of the sphere. The plunger 74 is then withdrawn to release single sphere 70a (FIG. 2) for delivery to the track 42. With the impact parameter and impact energy provided by the component positioning illustrated in FIG. 2, the sphere 70a is shown in sequential phantom view on a "capture" path, tracing upwardly on the mound 14 for launching from the upper edge thereof into a trajectory terminating within the limits of the tapered surface 16 and bore 18 for transmission through a tube 30 to the appropriate pair of rails in the rack 26. Obviously, increase of the launch energy by raising the magazine 56 on the plate 40 will alter the trajectory of the sphere in such a manner that the spheres can be projected over the tapered surface 16 for ultimate reception in the receivers 22 on the far side of the platform 10. By lowering the magazine, the launch energy can be decreased so that the spheres do not project to a sufficient degree to fall into the tapered surface 16 and bore 18. The spheres then return down the surface of the mound 14 and are received in one of the receivers 22 on the near side of the platform 10. By simultaneously or independently varying the impact parameter or lateral position of the launcher 38, the spheres may be launched along the lines spaced from the launch line A–B (FIG. 1) and be thereby projected or rejected at an angle with respect to the launch line A–B to be received in receivers 22 at other points around the periphery of the platform 10. By keeping records of various impact energies and parameters and recording the number of spheres 70 accumulating in the racks 26 for the respective receivers, radiation parameters for given atoms and nuclei can be demonstrated.

In order to more fully understand the operation of the present invention and its relationship to atomic physics, it should be understood that the mound 14 represents a target atom or nucleus, the size, surface, shape and diameter of the bore 18 representing the particular characteristics of the target. The spheres 70 represent radiation particles bombarding the target when delivered from the launcher 38. Lateral adjustment of the launcher simulates adjustment of the particle impact parameter and variation of the delivery velocity of the spheres 70 simulates variation of particle impact energies.

The following characteristics are further defined in terms of the device as follows.

Impact parameter: lateral position of the plate 40 with respect to the launch line A–B (FIG. 1).
Beam strength: number of shots fired per unit impact parameter.
Cross section: number of events divided by beam strength.
Backscatter: scatter at an angle of greater than 90° from the direction of launch.
Capture: entry of sphere into bore 18.
Capture cross section: number of spheres captured divided by beam strength.
Back angle scattering cross section: number of spheres back-scattered divided by beam strength.
Differential scattering cross section: number of spheres scattered into an individual receiver 22 divided by beam strength.
Threshold energy: minimum impact energy required for capture.

The device simulates an isotropic beam of particles when several spheres are launched or shots are fired at a large number of impact parameters. The impact parameters are chosen so that the "width" of the beam is greater than the size of the target. In order to insure isotropy, the impact parameter must b selected at regular intervals and the same number of shots fired from each launcher position. Since the differential scattering cross section is equal to the number of spheres scattered into a particular receiver 22, divided by beam strength, the cross section until is a length rather than an area and, as such, is referred to as linear cross section. Since the analysis of the scattering process is two dimensional, the beam strength is measured in terms of particles per unit length as opposed to particles per unit area as in three dimensional scattering process analysis.

The angular distribution of the balls scattered from the target is obtained by plotting the differential scattering cross section as a function of the scattering angle. In the particular analyzer illustrated, the receivers 22 are disposed at 20° increments and, as a result, angular distribution takes the form of a histogram.

Since the impact energy is variable, it is possible to examine the angular distributions, back angle scattering cross sections and capture cross sections of an atom or nucleus as a function of energy of radiation. The concept of threshold energy is introduced by determining the minimum energy required for capture, and a plot of the capture cross section as a function of energy not only depicts threshold energy but also the concept of resonance.

It should be obvious that launcher systems other than those specifically illustrated may be substituted without exceeding the scope of the invention. For example, the magazine-track launching apparatus illustrated may be replaced by a direct plunger-ejector, of the pinball machine type, with impact energy adjusted by varying deflection of the plunger or using a variable spring force to vary the energy imparted to the sphere on launching.

What has been set forth above is intended primarily as exemplary of a teaching of the invention to enable those skilled in the art in the practice thereof. It should therefore be understood that, within the scope of the appended claims, the invention may be practiced other than as specifically described.

What is new and therefore desired to be protected by Letters Patent of the United States is:

1. A macroscopic scattering analyzer comprising: a platform including a potential surface of revolution defining an upstanding mound, said mound having a vertical recess centrally disposed therein, a plurality of receivers surrounding the base of said mound;

a plurality of spheres; and launching means disposed adjacent the base of said mound for delivering said spheres substantially parallel to a launch line bisecting said recess and tangent to said surface of revolution, said launching means including means to vary the energy of delivery of said spheres, and means for adjusting the position of said launcher along a line normal to said launch line.

2. An analyzer in accordance with claim 1 wherein said surface of revolution is defined by a curve having the relationship $Z=1/\rho$.

3. An anlyzer in accordance with claim 2 further including an outwardly and downwardly tapering surface between the base of said mound and said receivers, said tapering surface intersecting said surface of revolution along a line where a tangent to said surface of revolution is substantially horizontal.

4. An analyzer in accordance with claim 2 wherein said recess includes a downwardly and inwardly tapering surface surrounding a bore, said downwardly and inwardly tapering surface intersecting said surface of revolution along a line where a tangent to said surface of revolution is substantially vertical.

5. An analyzer in accordance with claim 1 further comprising means to record spheres received in said recess and in each of said receivers.

6. An apparatus in accordance with claim 1 wherein said launcher comprises an arcuate sphere conveying track concave along a plane normal to the plane of said launcher and a sphere storage and dispensing means to sequentially deliver spheres to said track.

7. An analyzer in accordance with claim 6 wherein said means to vary the energy of delivery of said spheres comprises means to vary the position of said storage and dispensing means along said track.

8. An analyzer in accordance with claim 7 wherein said means to adjust the position of said launcher normal to said launch line comprises a threaded opening through said launcher normal to said launch line, a correspondingly threaded drive rod rotatably mounted on said platform normal to said launch line and disposed through said threaded opening, and means to rotate said drive rod.

References Cited
UNITED STATES PATENTS 1,165,798 12/1915 Messenger _____ 273—120
3,196,558 7/1965 Webb _____ 35—45

HARLAND S. SKOGQUIST, Primary Examiner

U.S. Cl. X.R.

273—95, 120